(12) United States Patent
Luo et al.

(10) Patent No.: US 12,481,628 B2
(45) Date of Patent: Nov. 25, 2025

(54) DATA MIGRATION METHOD AND APPARATUS, DEVICE, DISTRIBUTED SYSTEM AND STORAGE MEDIUM

(71) Applicant: ALIBABA CLOUD COMPUTING CO., LTD., Hangzhou (CN)

(72) Inventors: Yanxin Luo, Zhejiang (CN); Feifei Li, Zhejiang (CN); Wei Cao, Zhejiang (CN)

(73) Assignee: ALIBABA CLOUD COMPUTING CO., LTD., Hangzhou (CN)

( * ) Notice: Subject to any disclaimer, the term of this patent is extended or adjusted under 35 U.S.C. 154(b) by 159 days.

(21) Appl. No.: 18/043,892

(22) PCT Filed: Sep. 3, 2021

(86) PCT No.: PCT/CN2021/116371
§ 371 (c)(1),
(2) Date: Mar. 2, 2023

(87) PCT Pub. No.: WO2022/048622
PCT Pub. Date: Mar. 10, 2022

(65) Prior Publication Data
US 2024/0028568 A1 Jan. 25, 2024

(30) Foreign Application Priority Data
Sep. 4, 2020 (CN) .......... 202010923655.1

(51) Int. Cl.
*G06F 16/21* (2019.01)
*G06F 16/22* (2019.01)
*G06F 16/27* (2019.01)

(52) U.S. Cl.
CPC ........ *G06F 16/214* (2019.01); *G06F 16/2282* (2019.01); *G06F 16/27* (2019.01)

(58) Field of Classification Search
CPC .................................................. G06F 16/214
(Continued)

(56) References Cited

U.S. PATENT DOCUMENTS 10,657,154 B1 * 5/2020 Dugar .................. G06F 16/214
2009/0300037 A1 * 12/2009 Kariv ...................... G06F 16/20
(Continued)

FOREIGN PATENT DOCUMENTS

| CN | 104486373 A | 4/2015 |
| CN | 105824846 A | 8/2016 |

(Continued)

OTHER PUBLICATIONS

International Search Report of PCT/CN2021/116371, Nov. 25, 2021, 4 pages.
(Continued)

*Primary Examiner* — Muluemebet Gurmu
(74) *Attorney, Agent, or Firm* — Clark Hill PLC

(57) ABSTRACT

A data migration method and apparatus, a device, a distributed system and a storage medium are provided. Said method is applied to each data node in a distributed system comprising a plurality of data nodes. Said method comprises: determining, in a current data migration task, a table to be migrated of a current node, and a target data node (S101); and writing incremental data in the table to be migrated into the table to be migrated, and a target data table of the target data node, the incremental data being data obtained by performing, after the data migration task is started, a change operation on data in the table to be migrated (S102).

18 Claims, 6 Drawing Sheets

(58) Field of Classification Search
USPC .......................................................... 707/609
See application file for complete search history.

(56) References Cited

U.S. PATENT DOCUMENTS

| | | | | |
|---|---|---|---|---|
| 2012/0137098 A1* | 5/2012 | Wang | ................... | G06F 3/0647 |
| | | | | 711/E12.002 |
| 2018/0074749 A1* | 3/2018 | Kabakura | ............. | G06F 3/0617 |
| 2019/0179808 A1* | 6/2019 | Xu | ...................... | G06F 11/1451 |
| 2021/0334252 A1* | 10/2021 | Tong | ................... | G06F 16/214 |
| 2021/0406229 A1* | 12/2021 | Taranov | ............. | G06F 16/2246 |

FOREIGN PATENT DOCUMENTS

| | | | |
|---|---|---|---|
| CN | 107016029 A | | 8/2017 |
| CN | 110019140 A | | 7/2019 |
| CN | 110399356 A | | 11/2019 |
| CN | 111104392 A | | 5/2020 |
| CN | 111797172 A | | 10/2020 |
| WO | WO 2018099397 A1 | | 6/2018 |

OTHER PUBLICATIONS

Written Opinion of the International Searching Authority for PCT/CN2021/116371, Nov. 25, 2021, 4 pages.

\* cited by examiner

DATA MIGRATION METHOD AND APPARATUS, DEVICE, DISTRIBUTED SYSTEM AND STORAGE MEDIUM

The present application is a U.S. national phase patent application of PCT/CN2021/116371, filed Sep. 3, 2021, which claims priority to Chinese patent application No. 202010923655.1, filed on Sep. 4, 2020 and entitled "DATA MIGRATION METHOD AND APPARATUS, DEVICE, DISTRIBUTED SYSTEM AND STORAGE MEDIUM", each of the aforesaid applications being incorporated herein by reference in its entirety.

TECHNICAL FIELD

The specification relates to a field of data processing, and in particular to a data migration method, a data migration apparatus, a device, a distributed system and a storage medium.

BACKGROUND

A distributed system is a loosely coupled system composed by a plurality of data nodes interconnected through a communication line. Each data node is a computer device capable for processing a certain transaction independently. In a case where a load of a data node is heavier, part of data on the node needs to be migrated to other data nodes in order to reduce the load of the data node.

For this reason, it is necessary to provide a data migration method to realize data migration.

SUMMARY

Embodiments of the specification provide a data migration method and apparatus, a device, a distributed system and a storage medium, in order to overcome the problems of relevant technologies.

In the first aspect, an embodiment of the specification provides a data migration method, which is applied to each data node of multiple data nodes included in a distributed system, wherein the method includes: determining a target data node and a table to be migrated of a data node for a present data migration task; and writing, to a target data table of the target data node and the table to be migrated, incremental data in the table to be migrated, wherein the incremental data is data obtained by performing, after the data migration task is started, a change operation on data in the table to be migrated.

Optionally, after determining the target data node and the table to be migrated of the data node for the present data migration task, the method further includes: acquiring, from a database of the data node, metadata of the table to be migrated; and establishing, according to the metadata, the target data table in a database of the target data node.

Optionally, the method further includes: writing, to the target data table of the target data node, stock data in the table to be migrated, wherein the stock data is data in the table to be migrated before the data migration task is started.

Optionally, before writing, to the target data table of the target data node and the table to be migrated, the incremental data in the table to be migrated, the method further includes: recording site information, wherein the site information indicates a value range of a primary key in the table to be migrated before the incremental data is written to the table to be migrated and the target data table; and the writing, to the target data table of the target data node, the stock data in the table to be migrated, includes: acquiring the site information of the table to be migrated; determining, according to the value range of the primary key in the table to be migrated indicated by the site information, the stock data in the table to be migrated; and reading the stock data in the table to be migrated and writing the stock data to the target data table.

Optionally, in a case where both a migration state of the table to be migrated and a migration state of the target data table are a first state, operations of writing the incremental data to the table to be migrated and the target data table are performed; before writing, to the table to be migrated and the target data table, the incremental data in the table to be migrated, the method further includes: determining the migration state of the table to be migrated as the first state; and synchronizing state information indicating the first state with the target data node, so that the target data node determines the migration state of the target data table as the first state.

Optionally, the incremental data is data obtained by performing, after both the migration state of the table to be migrated and the migration state of the target data table are determined as the first state, the change operation on the data in the table to be migrated; and the stock data is data in the table to be migrated before both the migration state of the table to be migrated and the migration state of the target data table are determined as the first state.

Optionally, in a case where both a migration state of the table to be migrated and a migration state of the target data table are a second state, an operation of writing the stock data to the target data table is performed; before writing, to the target data table of the target data node, the stock data in the table to be migrated, the method further includes: determining the migration state of the table to be migrated as the second state; and synchronizing state information indicating the second state with the target data node, so that the target data node determines the migration state of the target data table as the second state.

Optionally, the change operation performed on the data in the table to be migrated and the operation of determining the migration state of the table to be migrated and the migration state of the target data table are mutually exclusive.

Optionally, the change operation performed on the data in the table to be migrated is performed after a read lock for the table to be migrated is acquired; the operation of determining the migration state of the table to be migrated and the migration state of the target data table is performed after a write lock for the table to be migrated is acquired; and the read lock and the write lock are mutually exclusive.

Optionally, before writing, to the target data table of the target data node and the table to be migrated, the incremental data in the table to be migrated, the method further includes: recording site information, wherein the site information indicates a value range of a primary key in the table to be migrated before both the migration state of the table to be migrated and the migration state of the target data table are determined as the first state; and the site information is used to determine the stock data of the table to be migrated.

Optionally, the method further includes: after the stock data has been written, sending a switch request to the target data node, wherein the switch request is used to switch, to the target data table, a read operation on the table to be migrated; and after the switching is completed, stopping a write operation on the table to be migrated.

Optionally, the change operation performed on the data in the table to be migrated and the operation of switching, to the target data table, the read operation on the table to be migrated are mutually exclusive.

Optionally, the change operation performed on the data in the table to be migrated is performed after a read lock for the table to be migrated is acquired; the operation of switching, to the target data table, the read operation on the table to be migrated is performed after a write lock for the table to be migrated is acquired; and the read lock and the write lock are mutually exclusive.

Optionally, the sending the switch request to the target data node, further includes: after verifying that the data in the table to be migrated is consistent with the data in the target data table, sending the switch request to the target data node.

In the second aspect, an embodiment of the specification provides a data migration apparatus, which is applied to each data node of multiple data nodes included in a distributed system, wherein the apparatus includes: a migration information determination module, configured for determining a target data node and a table to be migrated of a data node for a present data migration task; and an incremental data migration module, configured for writing, to a target data table of the target data node and the table to be migrated, incremental data in the table to be migrated, wherein the incremental data is data obtained by performing, after the data migration task is started, a change operation on data in the table to be migrated.

In the third aspect, an embodiment of the specification provides a computer program, which includes a memory, a processor, and a computer program that is stored in the memory and may be run on the processor, wherein the processor, when executing the computer program, implements any method according to the first aspect.

In the fourth aspect, an embodiment of the specification provides a distributed system including multiple data nodes, wherein each one of the data nodes is configured for: determining a target data node and a table to be migrated of a data node for a present data migration task; and writing, to a target data table of the target data node and the table to be migrated, incremental data in the table to be migrated, wherein the incremental data is data obtained by performing, after the data migration task is started, a change operation on data in the table to be migrated.

In the fifth aspect, an embodiment of the specification provides a computer-readable storage medium, wherein the computer-readable storage medium has stored a computer program, and the computer program, when executed by a processor, implements any method according to the first aspect.

The technical solutions provided by the embodiments of the specification may include the following beneficial effects: in the embodiments of the specification, a double write operation is performed on the incremental data, so that all the change operations performed on the data in the table to be migrated are performed in both the table to be migrated and the target data table once before the data migration task is completed, thereby ensuring the atomicity of operations on both sides and realizing effective data migration. Since the incremental data is written by the data node in real time to the table to be migrated and the target data table without using any other third-party tool, the technical solutions have broad applicability. Furthermore, because the double write operation is performed on the incremental data, the client does not need to stop access to the table to be migrated during data migration, which is helpful to improve access efficiency and user experience.

It should be understood that the above general description and the following detailed description are only exemplary and explanatory, not for limiting the specification.

BRIEF DESCRIPTION OF THE DRAWINGS

The drawings herein are incorporated into the specification, and constitute a part of the specification. They illustrate the embodiments in accordance with the specification, and are used in conjunction with the specification to explain the principles of the specification.

DETAILED DESCRIPTION

Figure 1:
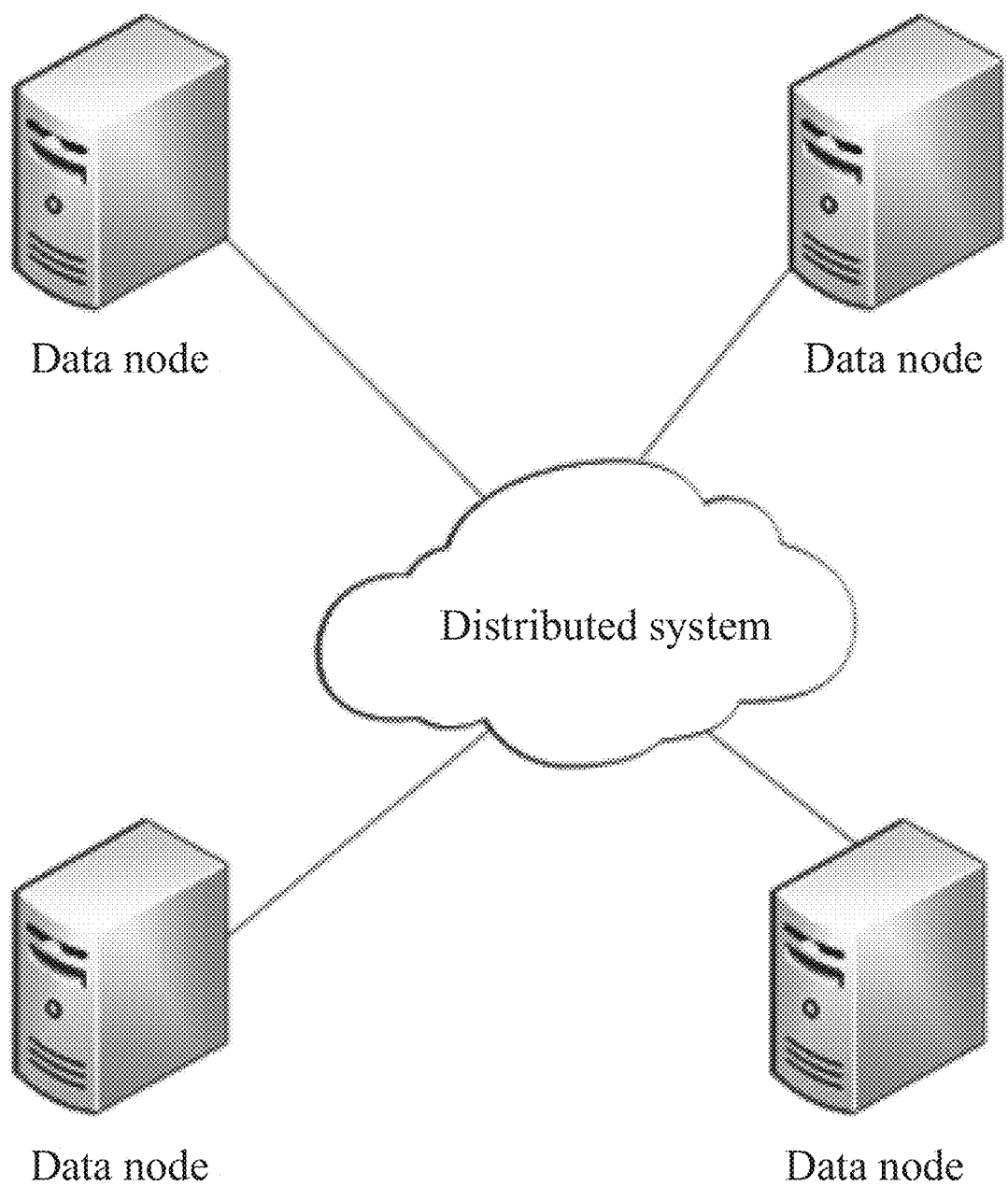
FIG. 1 is a diagram of an application scenario of a data migration method demonstrated by the specification according to an exemplary embodiment.

The exemplary embodiments, whose examples are illustrated in the drawings, are depicted herein in details. When the figures are involved in the following description, the same reference numbers throughout a plurality of figures denote the same or like elements unless otherwise specified. The implementations depicted in the following exemplary embodiments do not cover all the implementations in accordance with the specification. By contrast, they are only examples of the apparatus and method, which are depicted in details in the claims, in accordance with some aspects of the specification.

The terms used in the specification are merely for the purpose of depicting particular embodiments and are not intended to limit the specification. Singular forms, e.g., "a", "the" and "this", used in the specification and the claims are also intended to include plural forms unless the context clearly indicates otherwise. It should also be understood that the term "and/or" refers to and includes any or all of possible combinations of one or multiple interrelated term(s) that is/are listed.

It should be understood that, although terms such as "the first", "the second", "the third" may be used in the specification to depict various information, this information should not be limited to what these terms describe. These terms are used only to distinguish the information of a same type from each other. For example, without departing from the scope of the specification, the first information may be called the second information, and similarly, the second information may be called the first information. Depending on the context, the wording "if" as used herein may be interpreted as "in a case where" or "when" or "in response to determining".

Referring to FIG. 1, a distributed system is a loosely coupled system composed by a plurality of data nodes interconnected through a communication line. Each data node is a computer device capable for processing a certain transaction independently. In a case where a load of a data node is heavier, part of data on the node needs to be migrated to other data nodes in order to reduce the load of the data node.

An asynchronous data replication mechanism based on binlog is commonly used in related art. The binlog is a binary log in a MySQL database, and is used for recording internal operations, e.g., addition, deletion, modification, and check, which update the content of the MySQL database, mainly for the purpose of the master/slave replication and incremental recovery of the database. Specifically, during data migration, (1) a full table scan is performed on a data table to be migrated in a current data node, the stock data in the table is read one by one and inserted into a new data table of a new data node, and site information is recorded in a binlog; (2) for the incremental data (i.e., data obtained by changing the data in the data table during the data migration), all the log data after the site information in the binlog of (1) are replicated to a new node, and the incremental data are restored at the new node by replaying the log data.

Nevertheless, this data migration method mainly has the following main problems: firstly, a third-party tool is required for enabling reading and replay of the log data in the binlog; secondly, the binlog is required to hold log data of a long enough time range, to ensure that incremental data can be restored by replaying the log data. Nonetheless, if the binlog is lost, or if new log data cannot be written to the binlog due to insufficient storage space, the incremental data cannot be acquired from the binlog, resulting in data migration failure.

Figure 2:
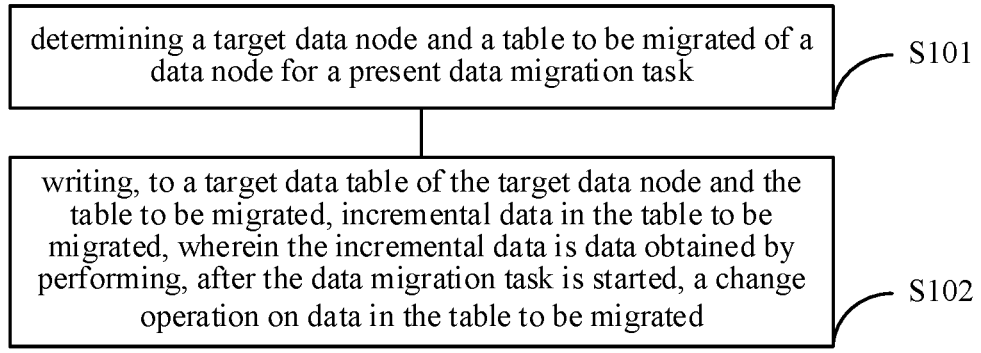
FIG. 2 is a flow chart of a data migration method demonstrated by the specification according to an exemplary embodiment.

For this reason, referring to FIG. 2, the embodiment of the specification provides a data migration method, which is applied to each data node of multiple data nodes included in a distributed system. The data migration method includes the following steps:

Step S101: determining a target data node and a table to be migrated of a data node for a present data migration task.

Step S102: writing, to a target data table of the target data node and the table to be migrated, incremental data in the table to be migrated, wherein the incremental data is data obtained by performing, after the data migration task is started, a change operation on data in the table to be migrated.

In one embodiment, the data migration task may be triggered by a client, or may be triggered automatically by a distributed system. In one example, the client may send, to the data node, an instruction carrying the data migration task, and then the data node receives the instruction and performs the data migration task according to the instruction. In another embodiment, the distributed system includes a dispatching system configured to effectively manage multiples data nodes in the distributed system. In a case where the dispatching system detects that the load of a certain data node exceeds a preset threshold, the dispatching system automatically sends an instruction carrying the data migration task to the data node, and the data node receives the instruction and performs the data migration task according to the instruction.

After the data node receives the instruction carrying the data migration task, the data node first determines a target data node and a table to be migrated of the data node for the present data migration task. That is to say, the present data migration task indicates that the table to be migrated and its data should be migrated to the database of the target node.

The data node first acquires the metadata of the table to be migration from the database of the data node. The metadata is data for describing data, and mainly is information describing data properties. Then, the data node establishes the target data table in the database of the target data node based on the metadata, thus the data in the table to be migrated may be migrated to the target data table.

In one possible implementation, in order to ensure the data security between data nodes, the data node needs to, before establishing the target data table in the database of the target data node, send a notification message to the target data node. The notification message indicates that the target data table will be established in the database of the target data node. Only after the data node has received a response of the target data node for the notification message, the data node establishes the target data table in the database of the target data node. Thus, the data security between data nodes is guaranteed effectively.

After establishing the target data table, the data node writes, to the target data table of the target data node, stock data in the table to be migrated, wherein the stock data is data in the table to be migrated before the data migration task is started; and the data node writes, to the table to be migrated and the target data table, incremental data in the table to be migrated, wherein the incremental data is data obtained by performing, after the data migration task is started, a change operation on data in the table to be migrated. Herein, the change operation refers to a basic operation performed on the data in the table to be migrated, such as an operation of insertion, deletion, or modification to the data in the table to be migrated. In one example, the operation may be a data manipulation language (DML) operation.

In one embodiment, before writing, to the target data table of the target data node and the table to be migrated, the incremental data in the table to be migrated, the data node may record the site information, wherein the site information indicates a value range of a primary key in the table to be migrated before the incremental data is written to the table to be migrated and the target data table. The site information is used to determine the stock data in the table to be migrated. In the case of preparing the migration of the stock data, the data node first acquires the site information of the table to be migrated, then determines, according to the value range of the primary key in the table to be migrated indicated by the site information, the stock data in the table to be migrated, and finally, reads the stock data in the table to be migrated and writes the stock data into the target data table.

In this embodiment, a double write operation is performed on the incremental data, so that all the change operations performed on the data in the table to be migrated are performed in both the table to be migrated and the target data table once before the data migration task is completed, thereby ensuring the atomicity of operations on both sides and realizing effective data migration. Since the incremental data is written by the data node in real time to the table to be migrated and the target data table without using any third-party tool or relying on binlog logs, the technical solutions have broad applicability. Furthermore, because the double write operation is performed on the incremental data, the client does not need to stop access to the table to be migrated during data migration, which is helpful to improve access efficiency and user experience.

In one implementation, the data node may perform double write (i.e., writing to both the table to be migrated and the target data table) on the incremental data by an XA (eXtended Architecture) transaction. The XA transaction is a distributed transaction managed by using a two-phase commit approach. Specifically, the database of the data node is provided with a corresponding database resource manager. After receiving the instruction carrying the change operation, the data node transfers the instruction carrying the change operation to the database resource manager of the data node and the database resource manager of the target data node, and then implements the double write on the data by the XA transaction. The first stage is prepare phase: after the database resource manager of the data node is ready to perform the change operation, the database resource manager of the data node reports to the data node that the database resource manager of the data node is ready; and after the database resource manager of the target data node is ready to perform the change operation, the database resource manager of the target data node reports to the data node that the database resource manager of the target data node is ready. The second stage is commit phase: after the data node confirms that both the database resource manager of the data node and the database resource manager of the target data node are ready, the data node sends a commit instruction to the database resource manager of the data node and the database resource manager of the target data node, so that the database resource manager of the data node performs, based on the commit instruction, the change operation on the table to be migrated and the database resource manager of the target data node performs, based on the commit instruction, the change operation on the target data table, thereby ensuring the atomicity and consistency between both sides' operations.

Figure 3:
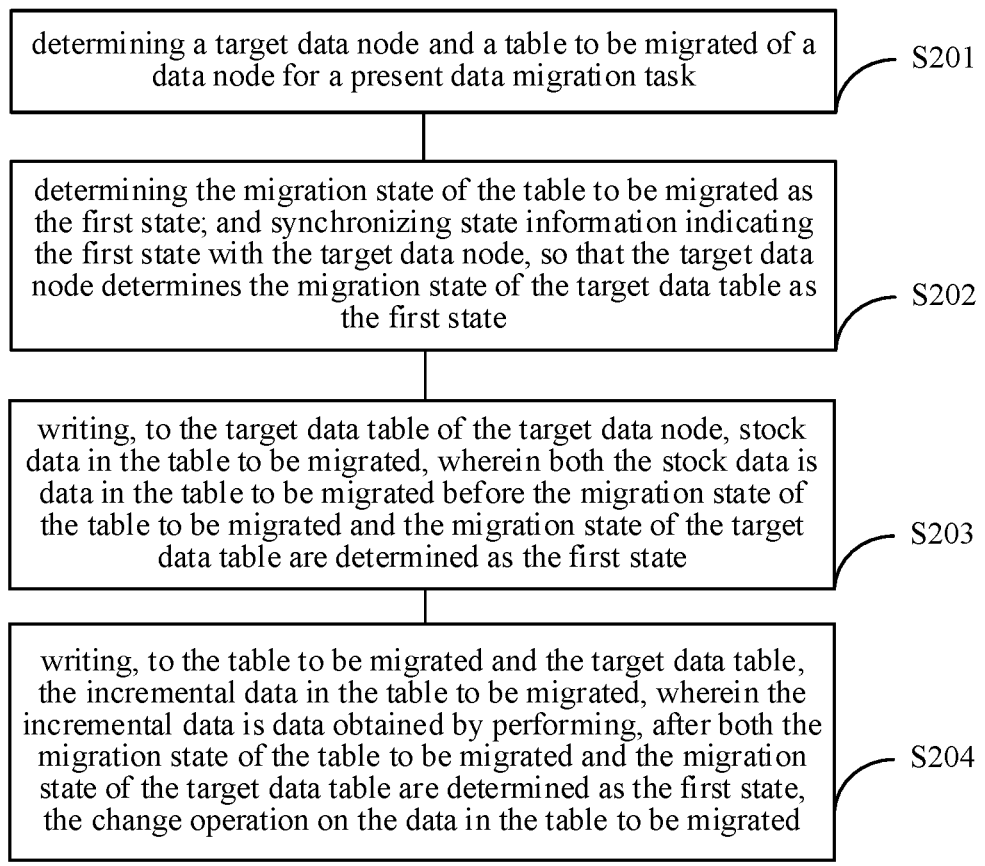
FIG. 3 is a flow chart of a second data migration method demonstrated by the specification according to an exemplary embodiment.

In one embodiment, the data node performs, in a case where both a migration state of the table to be migrated and a migration state of the target data table are a first state, the operations of writing the incremental data to the table to be migrated and the target data table. FIG. 3 shows a process flow of a second data migration method demonstrated by the specification according to one exemplary implementation. The method includes the following steps:

Step S201, determining a target data node and a table to be migrated of a data node for a present data migration task.

Step S202, determining the migration state of the table to be migrated as the first state; and, synchronizing state information indicating the first state with the target data node, so that the target data node determines the migration state of the target data table as the first state.

Step S203, writing, to the target data table of the target data node, stock data in the table to be migrated, wherein the stock data is data in the table to be migrated before both the migration state of the table to be migrated and the migration state of the target data table are determined as the first state.

Step S204, writing, to the table to be migrated and the target data node, the incremental data in the table to be migrated, wherein the incremental data is data obtained by performing, after both the migration state of the table to be migrated and the migration state of the target data table are determined as the first state, the change operation on the data in the table to be migrated.

In one implementation, before writing, to the table to be migrated and the target data table, the incremental data in the table to be migrated, the data node first determines the migration state of the table to be migrated as the first state. The first state indicates that the double write operation may be performed on the incremental data, that is to say, the incremental data may be written to both the table to be migrated and the target data table. Then, the data node synchronizes state information indicating the first state with the target data node, so that the target data node determines the migration state of the target data table as the first state. Thus, after both the migration state of the table to be migrated and the migration state of the target data table are the first state, the change operations on the table to be migrated, which are sent from the client may be performed in both the table to be migrated and the target data table.

Considering that the data in the table to be migrated may be changed at any time during the process of data migration task, in a case where the change operation performed on the data in the table to be migrated is received during the process of determining the migration state of the table to be migrated and the migration state of the target data table as the first state, if both are performed simultaneously, the double write to some incremental data may be omitted, so that it is impossible to guarantee the data consistency between the data in the table to be migrated and the data in the target data table. Thus, in the embodiments of the specification, the change operation performed on the data in the table to be migrated and the operation of determining the migration state of the table to be migrated and the migration state of the target data table are mutually exclusive.

That is to say, in the case of performing the operation of determining the migration state of the table to be migrated as the first state, the data node needs to wait until all current change operations on the table to be migrated have been performed. Moreover, no change operation on the table to be migrated may be performed during the period of determining the migration state of the table to be migrated and the migration state of the target data table as the first state, but the change operation may be performed on the table to be migrated only after both the migration state of the table to be migrated and the migration state of the target data table are determined as the first state, which is helpful to ensure the data consistency between the data in the table to be migrated and the data in the target data table.

In one implementation, orderly performance of the two processes can be ensured by competing an MDL metadata lock. In the implementation, the change operation performed on the data in the table to be migrated is performed after a read lock for the table to be migrated is acquired: the operation of determining the migration state of the table to be migrated and the migration state of the target data table as the first state is performed after a write lock for the table to be migrated is acquired; and the read lock and the write lock are mutually exclusive. That is to say, only after the change operation performed on the table to be migrated is completed and the read lock is released, the write lock may be acquired and the operation of determining the migration state of the table to be migrated and the migration state of the target data table as the first state may be performed; and only after the operation of determining the migration state of the table to be migrated and the migration state of the target data table as the first state is completed and the write lock is released, the read lock may be acquired and the change operation performed on the table to be migrated may be performed. Thus, this is helpful to ensure the data consistency between the data in the table to be migrated and the data in the target data table.

Herein, the execution of the operation of determining the migration state of the table to be migrated and the migration state of the target data table as the first state is very fast. In the meantime, the execution of the change operation on the table to be migrated, sent from the client to the data node needs to wait until the operation of determining the migration state of the table to be migrated and the migration state of the target data table has been executed. However, the waiting time is too short to be perceived on the user level. From a user's perspective, the user may perform the change operation normally through the client on the table to be migrated.

It can be said that, the data node performs, in a case where both the migration state of the table to be migrated and the migration state of the target data table are the first state, the operations of writing the incremental data to the table to be migrated and the target data table, while data which is obtained by the change operation performed on the table to be migrated before both the migration state of the table to be migrated and the migration state of the target data table are determined as the first state is written only to the table to be migrated. That is to say, the incremental data is data obtained by performing, after both the migration state of the table to be migrated and the migration state of the target data table are determined as the first state, the change operation on the data in the table to be migrated; and the stock data is data in the table to be migrated before both the migration state of the table to be migrated and the migration state of the target data table are determined as the first state.

In one example, after determining both the migration state of the table to be migrated and the migration state of the target data table as the first state, the data node may record site information for the table to be migrated, wherein the site information indicates a value range of a primary key in the table to be migrated before both the migration state of the table to be migrated and the migration state of the target data table are determined as the first state. Thus, the stock data in the table to be migrated may be located based on the site information.

Before migrating the stock data, the data node may acquire the site information for the table to be migrated, wherein the site information indicates a value range of a primary key in the table to be migrated before both the migration state of the table to be migrated and the migration state of the target data table are determined as the first state. For example, the site information includes the maximum and minimum values of the primary key of the table to be migrated. Then, the data node determines, according to the value range of the primary key in the table to be migrated indicated by the site information, the stock data in the table to be migrated, and reads the stock data in the table to be migrated and writing the stock data to the target data table. In this implementation, based on the site information, the accurate location of the stock data is realized, and the effective migration of the stock data is realized.

Similarly, the data node performs in a case where both a migration state of the table to be migrated and a migration state of the target data table are a second state, an operation of writing the stock data to the target data table. Before writing, to the target data table of the target data node, the stock data in the table to be migrated, the data node first determines the migration state of the table to be migrated as the second state, so that the stock data of the table to be migrated may be written to the target data table. Then, the data node synchronizes state information indicating the second state with the target data node, so that the target data node determines the migration state of the target data table as the second state.

It should be noted that, the first state indicates that it may start to perform a double write operation on the incremental data, and the second state indicates that it may start to write the stock data of the table to be migrated to the target data table. The first state and the second state do not conflict, and can coexist.

In one implementation, in order to ensure the consistency between the data in the table to be migrated and the data in the target data table and avoid the impact of data inconsistency caused by the change operation from the client on the data in the table to be migrated during determination of the migration state of the table to be migrated and the migration state of the target data table, in the embodiment of the specification, the change operation performed on the data in the table to be migrated and the operation of determining the migration state of the table to be migrated and the migration state of the target data table are mutually exclusive.

That is to say, in the case of performing the operation of determining the migration state of the table to be migrated as the second state, the data node needs to wait until all current change operations on the table to be migrated have been performed. Moreover, no change operation on the table to be migrated can be performed during the period of determining the migration state of the table to be migrated and the migration state of the target data table as the second state, but the change operation may be performed on the table to be migrated only after both the migration state of the table to be migrated and the migration state of the target data table are determined as the second state, which is helpful to ensure the data consistency between the data in the table to be migrated and the data in the target data table.

In one implementation, orderly performance of the two processes can be ensured by competing an MDL metadata lock. In the implementation, the change operation performed on the data in the table to be migrated is performed after a read lock for the table to be migrated is acquired; the operation of determining the migration state of the table to be migrated and the migration state of the target data table as the first state is performed after a write lock for the table to be migrated is acquired; and the read lock and the write lock are mutually exclusive. Thus, this is helpful to ensure the data consistency between the data in the table to be migrated and the data in the target data table.

Herein, the execution of the operation of determining the migration state of the table to be migrated and the migration state of the target data table as the second state is very fast. In the meantime, the execution of the change operation on the table to be migrated, which is sent from the client to the data node needs to wait until the operation of determining the migration state of the table to be migrated and the migration state of the target data table as the second state has been executed. However, the waiting time is too short to be perceived on the user level. From a user's perspective, the user may perform the change operation normally through the client on the table to be migrated.

Furthermore, considering that, in relevant technologies, after data migration is completed, read and write operations on the table to be migrated may usually be given access to the target data table after the read and write operations on the table to be migrated are stopped. During the period of stopping to access, a service related to the table to be migrated is not available, which is unacceptable for some service parties who need to provide 7×24 online service (i.e., round-the-clock uninterrupted service). Based on this, the specification provides a switch method: after the stock data has been written, the incremental data is also written to the target data table by a timely double write manner. Then, the data node may send a switch request to the target data node, and continue to keep the double write of the incremental data in the process of switching, wherein the switch request is used to switch, to the target data table, a read operation on the table to be migrated. That is to say, the service related to the table to be migrated may continue to be used, and the write operation on the table to be migrated is stopped after the switching is completed. The embodiment combines the data double write mode, so that the user may perform an operation on the table to be migrated via the client in the process of switching the data table, to achieve online switching. Thus, this is conducive to improve the user experience.

To ensure the consistency between the data in the table to be migrated and the data in the target data table, in the embodiments of the specification, the change operation performed on the data in the table to be migrated and the operation of sending a switch request used to switch, to the target data table, the read operation on the table to be migrated are mutually exclusive.

That is to say, before sending the switch request, the data node needs to wait until all current change operations on the table to be migrated have been performed. Moreover, no change operation on the table to be migrated may be performed during the period between sending the switch request to receiving, from the target data node, the response to the switch request. Performing the change operation on the table to be migrated needs to wait until the response to the switch request is received, which indicates that the operation of sending the switch request used to switch, to the target data table, the read operation on the table to be migrated has been completed. At this time, the change operations on the table to be migrated may be performed. This is helpful to ensure the data consistency between the data in the table to be migrated and the data in the target data table.

In one implementation, orderly performance of the two processes can be ensured by competing an MDL metadata lock. In the implementation, the change operation performed on the data in the table to be migrated is performed after a read lock for the table to be migrated is acquired, and the read lock is released after the change operation is performed; the operation of switching, to the target data table, the read operation on the table to be migrated is performed after a write lock of the table to be migrated is acquired. That is to say, the data node sends the switch request to the target data node after acquiring the write lock, and after receiving the response to the switch request, the data node indicates that the operation of sending the switch request used to switch, to the target data table, the read operation on the table to be migrated has been completed. At this time, the write lock is released. The read lock and the write lock are mutually exclusive. Thus, this is helpful to ensure the data consistency between the data in the table to be migrated and the data in the target data table.

In the implementation, the execution of the operation of switching, to the target data table, the read operation on the table to be migrated is very fast. In the meantime, the execution of the change operation or search operation on the table to be migrated, sent from the client to the data node needs to wait until the operation of switching, to the target data table, the read operation on the table to be migrated has been executed. However, the waiting time is too short to be perceived on the user level. From a user's perspective, the user may perform the change operation or search operation normally through the client on the table to be migrated, while there may be a very short delay, which does not affect the use of the user.

In one implementation, after the writing of the incremental data is completed, in order to ensure the data consistency, the data node first verifies whether the data in the table to be migrated is consistent with the data in the target data table. In a case where the data in the table to be migrated is consistent with the data in the target data table, the data node sends a switch request to the target data node, wherein the switch request is used to switch, to the target data table, a read operation on the table to be migrated. The response to the switch request is received from the target data node, which indicates the switching is completed. After the switching is completed, the write operation on the table to be migrated is stopped. Then, the data node may delete data related to the table to be migrated, in the database of the data node. By now, the data migration task for the table to be migrated is completed.

Figure 4:
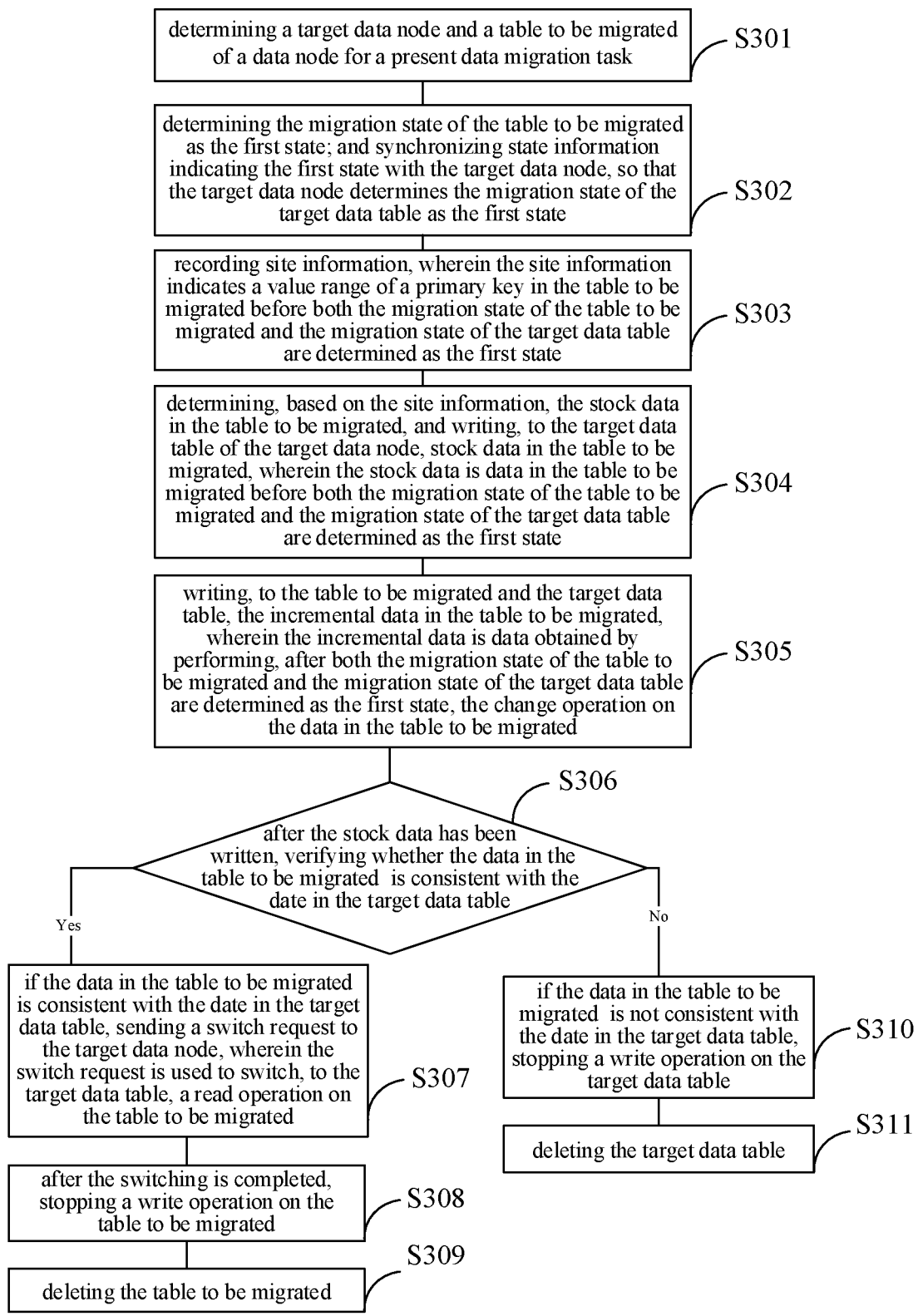
FIG. 4 is a flow chart of a third data migration method demonstrated by the specification according to an exemplary embodiment.

FIG. 4 is a flow chart of a third data migration method provided by an embodiment of the specification. The method includes the following steps:

Step S301, determining a target data node and a table to be migrated of a data node for a present data migration task.

Step S302, determining the migration state of the table to be migrated as the first state; and synchronizing state information indicating the first state with the target data node, so that the target data node determines the migration state of the target data table as the first state.

Step S303, recording site information, wherein the site information indicates a value range of a primary key in the table to be migrated before both the migration state of the table to be migrated and the migration state of the target data table are determined as the first state; the site information is used to determine the stock data of the table to be migrated.

Step S304, determining, based on the site information, the stock data in the table to be migrated, and writing, to the target data table of the target data node, stock data in the table to be migrated, wherein the stock data is data in the table to be migrated before both the migration state of the table to be migrated and the migration state of the target data table are determined as the first state.

Step S305, writing, to the table to be migrated and the target data table, the incremental data in the table to be migrated, wherein the incremental data is data obtained by performing, after both the migration state of the table to be migrated and the migration state of the target data table are determined as the first state, the change operation on the data in the table to be migrated.

Step S306, after the stock data has been written, verifying whether the data in the table to be migrated is consistent with the data in the target data table. If the data in the table to be migrated is consistent with the data in the target data table, executing Step S307 to Step S309; and if the data in the table to be migrated is not consistent with the data in the target data table, executing Step S310 to Step S311.

Step S307, if the data in the table to be migrated is consistent with the data in the target data table, sending a switch request to the target data node, wherein the switch request is used to switch, to the target data table, a read operation on the table to be migrated.

Step S308, after the switching is completed, stopping a write operation on the table to be migrated.

Step S309, deleting the table to be migrated.

Step S310, if the data in the table to be migrated is not consistent with the data in the target data table, stopping a write operation on the target data table.

Step S311, deleting the target data table.

In addition, another advantage of performing, by the data node, the data migration task in the specification is as follows. In relevant technologies, data migration is realized by a binlog-based asynchronous data duplication mechanism, since this relies on a third-party tool, there is no complete control over the database. Therefore, during the data migration, if the user performs some operations on the data table through the client, for example, performing changes to the data in the table with an ALTER TABLE statement (used for adding, modifying or deleting a column in an existing table), some of the data migrated to a new node might be invalid. At this time, the data migration task has to be performed again, which consumes too many computational resources. By contrast, the data migration method in the specification is performed directly at a data node, and there is complete control over a database on the data node. During the data migration, if a data definition language (DDL) operation on the table to be migrated, from a client is received, it may be performed after the migration of the table to be migrated is completed. Alternatively, an error hint may be returned to the client, and is used to inform the user that the DDL operations cannot be performed during the data migration.

Figure 5:
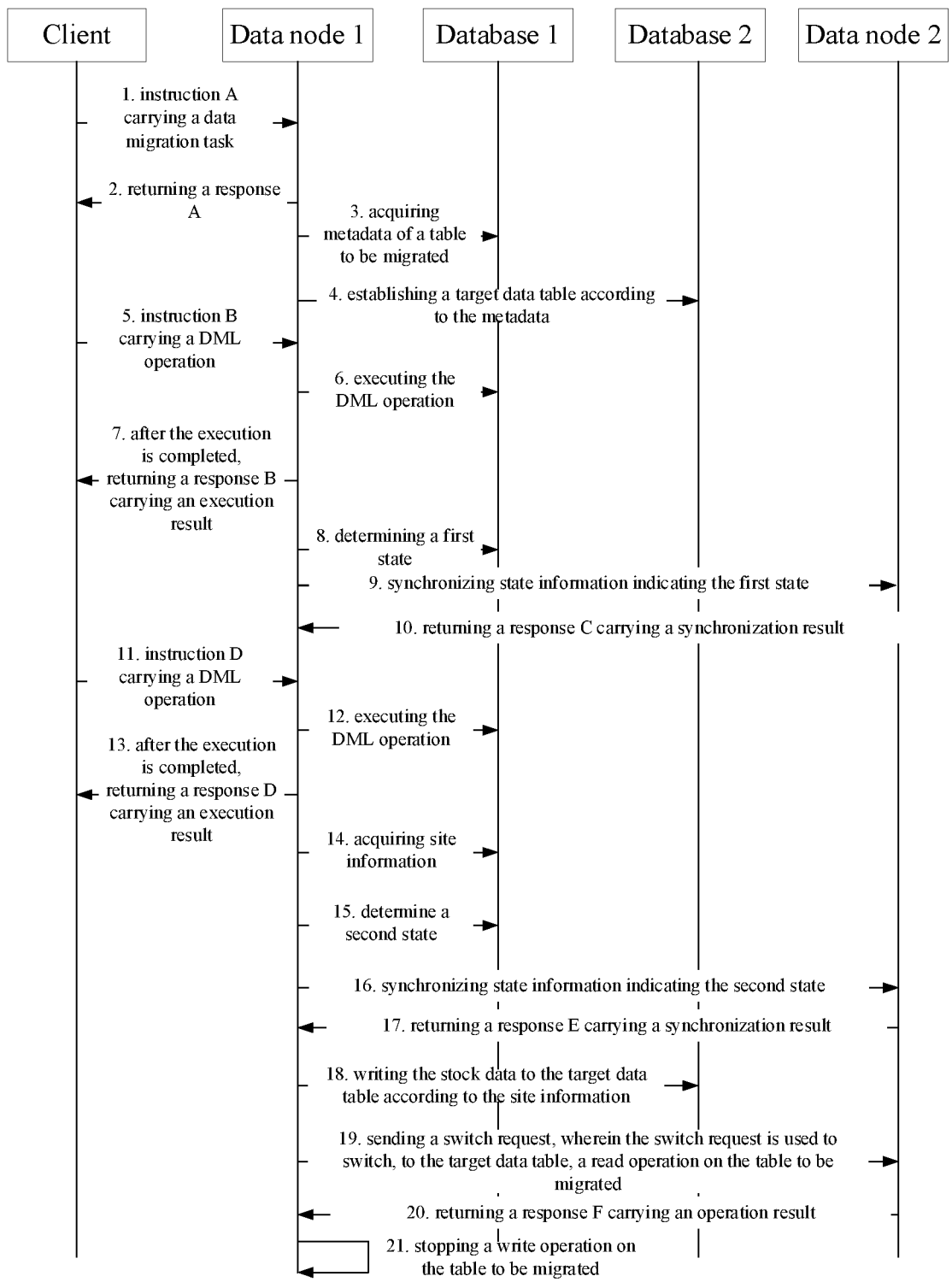
FIG. 5 is a timing diagram of a data migration method demonstrated by the specification according to an exemplary embodiment.

An example is given here to explain: a table to be migrated in a database 1 in a data node 1 being migrated to a database 2 in a data node 2. FIG. 5 shows a timing diagram of a data migration method according to an embodiment of the specification. The data migration method includes the following steps:

1. A client sends an instruction A carrying a data migration task to a data node 1.
2. The data node 18 sends a response A to the client based on the instruction A, wherein the response A is used to indicate to the client that the instruction A has been received.
3. The data node 1 acquires metadata of a table to be migrated from a database 1 according to the data migration task.
4. The data node 1 establishes a target data table in a database 2 based on the metadata of the table to be migrate.
5. The client sends, to the data node 1, an instruction B carrying a DML operation, wherein the DML operation is directed to data in the table to be migrated.
6. After the data node 1 acquires a read lock, the data node 1 performs the DML operation on the data in the table to be migrated.
7. After the execution is completed, the data node 1 returns, to the client, a response B carrying an execution result, and releases the read lock.
8. After the data node 1 acquires a write lock, the data node 1 determines the migration state of the table to be migrated as a first state.
9. The data node 1 synchronizes state information indicating the first state with a data node 2, so that the data node 2 determines the migration state of the target data table as the first state.
10. The data node 2 returns, to the data node 1, a response C carrying a synchronization result, wherein the synchronization result is used to indicate to the data node 1 that the migration state of the target data table has been determined as the first state; and the data node 1 releases the write lock based on the response C.

Herein, during Step 8 to Step 10, the execution of the instruction, carrying the DML operation, sent from the client to the data node 1 needs to wait, until Step 10 is finished and the read clock is acquired.

11. The client sends, to the data node 1, an instruction D carrying a DML operation, wherein the DML operation is directed to the data in the table to be migrated.
12. After the data node 1 acquires the read lock, the data node 1 performs the DML operation on the target data table and the data in the table to be migrated.
13. After the execution is completed, the data node 1 returns, to the client, a response D carrying an execution result, and releases the read lock.
14. The data node 1 acquires site information from the database 1, wherein the site information is recorded after both the migration state of the table to be migrated and the migration state of the target data table are determined as the first state.
15. After the data node 1 acquires the write lock, the data node 1 determines the migration state of the table to be migrated as a second state.
16. The data node 1 synchronizes state information indicating the second state with the data node 2, so that the data node 2 determines the migration state of the target data table as the second state.
17. The data node 2 returns, to the data node 1, a response E carrying a synchronization result, wherein the response E is used to indicate to the data node 1 that the migration state of the target data table has been determined as the second state; and the data node 1 releases the write lock based on the response E.

Herein, during Step 15 to Step 17, the execution of the instruction, carrying the DML operation, sent from the client to the data node 1 needs to wait, until Step 17 is finished and the read lock is acquired.

18. The data node 1 determines, according to the site information, stock data in the table to be migrated, and writes the stock data to the target data table.
19. After the stock data has been written, the data node 1 acquires the write lock, and then sends a switch request to the data node 2, wherein the switch request is used to switch, to the target data table, a read operation on the table to be migrated.
20. After the switching is completed, the data node 2 returns, to the data node 1, a response F carrying an operation result, for the switch request; and the data node 1 releases the write lock based on the response F.

Herein, during Step 19 to Step 20, the execution of the instruction, carrying the DML operation, sent from the client to the data node 1 needs to wait, until Step 20 is finished and the read lock is acquired.

21. The data node 1 stops the write operation on the table to be migrated.

Corresponding to the aforementioned embodiments of the data migration method, the embodiments of the specification also provide embodiments of a data migration apparatus and an electronic device to which the data migration apparatus is applied.

Figure 6:
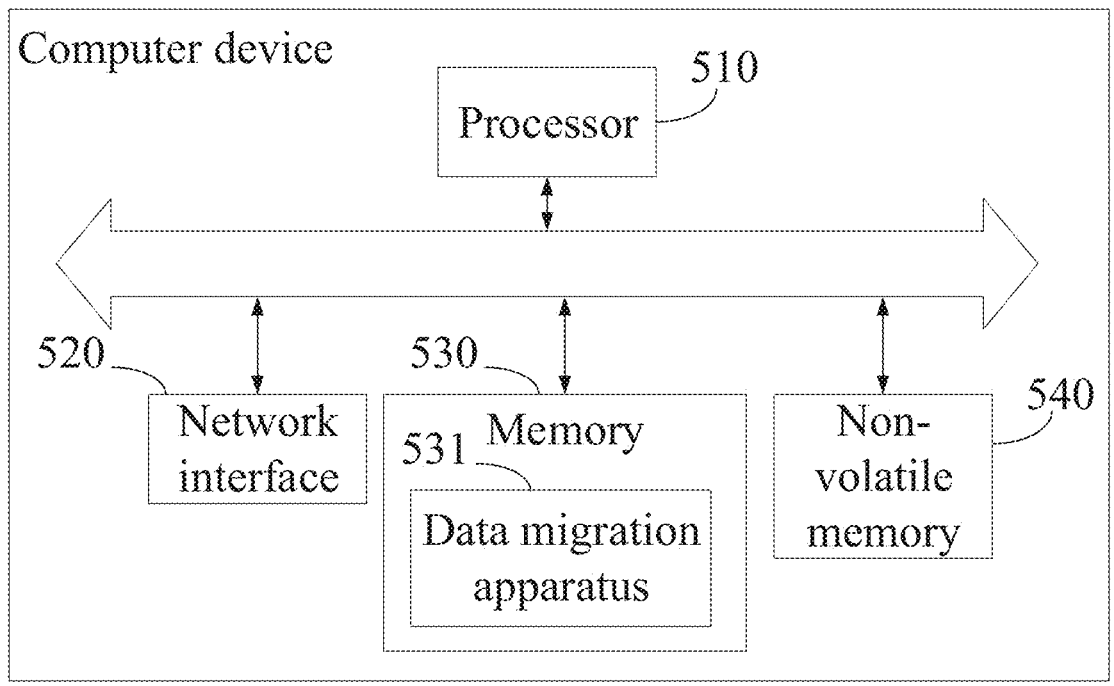
FIG. 6 is a hardware structure diagram of a computer device containing a data migration apparatus according to the specification.

The embodiment of the data migration apparatus of the specification may be applied to a computer device. The apparatus embodiment may be implemented by software, hardware, or a combination of software and hardware. In the implementation by software for example, as a logical apparatus, the apparatus is made by reading, by a processor of a computer where the apparatus is located, corresponding computer instructions in a non-volatile memory into a memory and running the corresponding computer instructions. From the hardware level, FIG. 6 shows a hardware diagram of a computer device containing the data migration apparatus of the specification. Besides a processor 501, a memory 530, a network interface 520 and a non-volatile memory 540 as shown in FIG. 6, the computer device in which the data migration apparatus 531 in the embodiment is located may include other hardware according to the actual functionality of the computer device, which will not be repeated herein.

Figure 7:
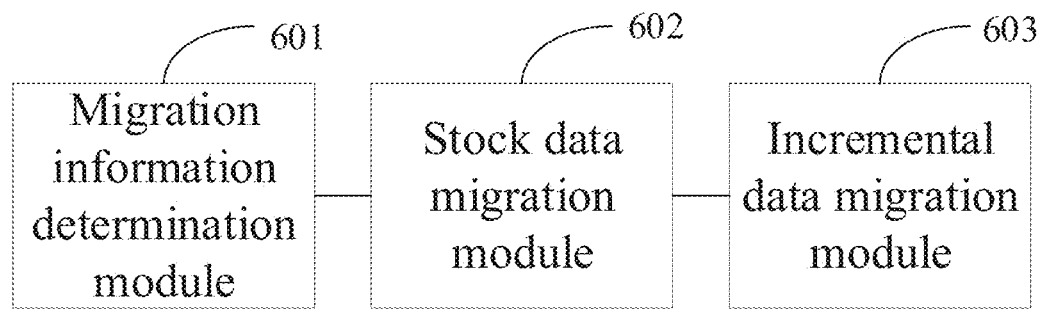
FIG. 7 is a block diagram of a data migration apparatus demonstrated by the specification according to an exemplary embodiment.

FIG. 7 shows a block diagram of a data migration apparatus demonstrated by the specification according to one exemplary embodiment. The data migration apparatus is applied to each data node of multiple data nodes included in a distributed system, and includes: a migration information determination module 601, configured for determining a target data node and a table to be migrated of a data node for a present data migration task; a stock data migration module 602, configured for writing, to the target data table of the target data node, stock data in the table to be migrated, wherein the stock data is data in the table to be migrated before the data migration task is started; and an incremental data migration module 603, configured for writing, to the table to be migrated and the target data table, incremental data in the table to be migrated, wherein the incremental data is data obtained by performing, after the data migration task is started, a change operation on data in the table to be migrated.

In an embodiment, in a case where both a migration state of the table to be migrated and a migration state of the target data table are a first state, operations of writing the incremental data to the table to be migrated and the target data table are performed.

Before the incremental data migration module 603, the apparatus further includes: a first state determination module, configured for determining the migration state of the table to be migrated as the first state; and synchronizing state information indicating the first state with the target data node, so that the target data node determines the migration state of the target data table as the first state.

In an embodiment, the incremental data is data obtained by performing, after both the migration state of the table to be migrated and the migration state of the target data table are determined as the first state, the change operation on the data in the table to be migrated; and the stock data is data in the table to be migrated before both the migration state of the table to be migrated and the migration state of the target data table are determined as the first state.

In an embodiment, in a case where both a migration state of the table to be migrated and a migration state of the target data table are a second state, an operation of writing the stock data to the target data table is performed.

Before the stock data migration module 602, the apparatus further includes: a second state determination module, configured for determining the migration state of the table to be migrated as the second state; and synchronizing state information indicating the second state with the target data node, so that the target data node determines the migration state of the target data table as the second state.

In an embodiment, the change operation performed on the data in the table to be migrated and the operation of determining the migration state of the table to be migrated and the migration state of the target data table are mutually exclusive.

In an embodiment, the change operation performed on the data in the table to be migrated is performed after a read lock for the table to be migrated is acquired; the operation of determining the migration state of the table to be migrated and the migration state of the target data table is performed after a write lock for the table to be migrated is acquired; the read lock and the write lock are mutually exclusive.

In an embodiment, the apparatus further includes: a switch module, configured for after the stock data has been written, sending a switch request to the target data node, wherein the switch request is used to switch, to the target data table, a read operation on the table to be migrated; a write operation stopping module, configured for after the switching is completed, stopping a write operation on the table to be migrated.

In an embodiment, the change operation performed on the data in the table to be migrated and the operation of switching, to the target data table, the read operation on the table to be migrated are mutually exclusive.

In an embodiment, the change operation performed on the data in the table to be migrated is performed after a read lock for the table to be migrated is acquired; the operation of determining the migration state of the table to be migrated and the migration state of the target data table is performed after a write lock for the table to be migrated is acquired; the read lock and the write lock are mutually exclusive.

In an embodiment, after the migration information determination module 601, the apparatus further includes: a target data table establishing module, configured for acquiring, from a database of the data node, metadata of the table to be migrated; and establishing, according to the metadata, the target data table in a database of the target data node.

In an embodiment, before the stock data migration module 602, the apparatus further includes: a site information acquiring module, configured for acquiring site information of the table to be migrated, wherein the site information indicates a value range of a primary key in the table to be migrated before both the migration state of the table to be migrated and the migration state of the target data table are determined as the first state.

The stock data migration module 602 is configured for: determining, according to the value range of the primary key in the table to be migrated indicated by the site information, the stock data in the table to be migrated: and reading the stock data in the table to be migrated and writing the stock data to the target data table.

In an embodiment, the switch module is further configured for: after verifying that the data in the table to be migrated is consistent with the data in the target data table, sending the switch request to the target data node.

For the embodiments of the apparatus, since it basically corresponds to the embodiments of the method, it is sufficient to refer to the embodiments of the method for relevant information. The above-described embodiments of the apparatus are only schematic. Herein, the modules described as separate components may or may not be physically separated, and the components shown as modules may or may not be physical modules, i.e., they may be located in one place or may be distributed to multiple network modules. Some or all of these modules may be selected according to practical needs, to achieve the purpose of the solution of the specification. It can be understood and implemented by those of ordinary skill in the art without paying creative efforts.

The embodiments of the specification further provide a computer device, which includes: a processor; and a memory configured to store instructions that may be executed by the processor.

Herein, the processor is configured for: determining a target data node and a table to be migrated of a data node for a present data migration task; writing, to the target data table of the target data node, stock data in the table to be migrated, wherein the stock data is data in the table to be migrated before the data migration task is started; and writing, to the table to be migrated and the target data table, incremental data in the table to be migrated, wherein the incremental data is data obtained by performing, after the data migration task is started, a change operation on data in the table to be migrated.

Each of the embodiments of the specification is depicted in a progressive manner, the same or similar parts between the various embodiments may be referred to each other, and each of the embodiments focuses on the differences from other embodiments. In particular, for the embodiments of the apparatus, its description is rather simple because it is basically similar to the embodiments of the method. For relevant parts, the part description of the embodiments of the method may be referred to.

The embodiments of the specification further provide a distributed system that includes multiple data nodes. The data nodes include but are not limited to a computer device, such as a server, a terminal and the like. Each of the data nodes is configured for: determining a target data node and a table to be migrated of a data node for a present data migration task; and writing, to a target data table of the target data node and the table to be migrated, incremental data in the table to be migrated, wherein the incremental data is data obtained by performing, after the data migration task is started, a change operation on data in the table to be migrated.

Optionally, after determining the target data node and the table to be migrated of the data node for the present data migration task, the data node is further configured for: acquiring, from a database of the data node, metadata of the table to be migrated; and establishing, according to the metadata, the target data table in a database of the target data node.

Optionally, the data node is further configured for: writing, to the target data table of the target data node, stock data in the table to be migrated, wherein the stock data is data in the table to be migrated before the data migration task is started.

Optionally, before writing, to the target data table of the target data node and the table to be migrated, the incremental data in the table to be migrated, the data node is further configured for: recording site information, wherein the site information indicates a value range of a primary key in the table to be migrated before the incremental data is written to the table to be migrated and the target data table.

In the case of writing, to the target data table of the target data node, the stock data in the table to be migrated, the data node is specifically configured for: acquiring the site information of the table to be migrated; determining, according to the value range of the primary key in the table to be migrated indicated by the site information, the stock data in the table to be migrated; and reading the stock data in the table to be migrated and writing the stock data to the target data table.

Optionally, in a case where both a migration state of the table to be migrated and a migration state of the target data table are a first state, operations of writing the incremental data to the table to be migrated and the target data table are performed.

Before writing, to the table to be migrated and the target data table, the incremental data in the table to be migrated, the data node is further configured for: determining the migration state of the table to be migrated as the first state; and synchronizing state information indicating the first state with the target data node, so that the target data node determines the migration state of the target data table as the first state.

Optionally, the incremental data is data obtained by performing, after both the migration state of the table to be migrated and the migration state of the target data table are determined as the first state, the change operation on the data in the table to be migrated.

The stock data is data in the table to be migrated before both the migration state of the table to be migrated and the migration state of the target data table are determined as the first state.

Optionally, in a case where both a migration state of the table to be migrated and a migration state of the target data table are a second state, an operation of writing the stock data to the target data table is performed.

Before writing, to the target data table of the target data node, the stock data in the table to be migrated, the data node is further configured for: determining the migration state of the table to be migrated as the second state; synchronizing state information indicating the second state with the target data node, so that the target data node determines the migration state of the target data table as the second state.

Optionally, the change operation performed on the data in the table to be migrated and the operation of determining the migration state of the table to be migrated and the migration state of the target data table are mutually exclusive.

Optionally, the change operation performed on the data in the table to be migrated is performed after a read lock for the table to be migrated is acquired.

The operation of determining the migration state of the table to be migrated and the migration state of the target data table is performed after a write lock for the table to be migrated is acquired; and the read lock and the write lock are mutually exclusive.

Optionally, before writing, to the target data table of the target data node and the table to be migrated, the incremental data in the table to be migrated, the data node is further configured for: recording site information, wherein the site information indicates a value range of a primary key in the table to be migrated before both the migration state of the table to be migrated and the migration state of the target data table are determined as the first state; and the site information is used to determine the stock data of the table to be migrated.

Optionally, the data node is further configured for: after the stock data has been written, sending a switch request to the target data node, wherein the switch request is used to switch, to the target data table, a read operation on the table to be migrated; and, after the switching is completed, stopping a write operation on the table to be migrated.

Optionally, the change operation performed on the data in the table to be migrated and the operation of switching, to the target data table, the read operation on the table to be migrated are mutually exclusive.

Optionally, the change operation performed on the data in the table to be migrated is performed after a read lock for the table to be migrated is acquired.

The operation of switching, to the target data table, the read operation on the table to be migrated is performed after a write lock for the table to be migrated is acquired; and the read lock and the write lock are mutually exclusive.

Optionally, in the case of sending the switch request to the target data node, the data node specifically configured for: after verifying that the data in the table to be migrated is consistent with the data in the target data table, sending the switch request to the target data node.

The embodiments of the specification further provide a computer storage medium, wherein the storage medium has stored program instructions, and the program instructions, when executed by a processor, implement any of the above-described methods.

The embodiments of the specification may take the form of a computer program product implemented on one or more storage mediums (including but not limited to disk storage, CD-ROM, optical storage, etc.) containing program codes. Computer-usable storage mediums include permanent and non-permanent, removable and non-removable media, and information storage may be realized by any method or technology. The information may be computer-readable instructions, data structure, program modules or other data. Examples of computer's storage mediums include and are not limited to: phase-change memory (PRAM), static random access memory (SRAM), dynamic random access memory (DRAM), other types of random access memory (RAM), read-only memory (ROM), electrically erasable programmable Read-only memory (EEPROM), flash memory or other memory technologies, compact-disc read-only memory (CD-ROM), digital versatile disc (DVD) or other optical storage, cassette magnetic tape, magnetic tape storage or other magnetic memory or any other non-transmitting storage, which may be used to store the information that may be accessed by computer devices.

After considering the specification and practicing the application claimed herein, those of skills in the art will easily think of other embodiments of the specification. The specification is aimed to cover any variants, uses or adaptive changes of the specification, and these variants, uses or adaptive changes are compatible with the general principle of the specification and include the common knowledge or conventional technical means in the art that the specification does not apply for. The specification and the embodiments are only exemplary, and the actual scope and spirit of the specification is indicated by the claims below.

It should be understood that, the specification is not limited to the precise structure that has been described above and shown in the drawings, and may be modified or changed without departing from the scope of the specification. The scope of the specification is only limited by the attached claims.

The above are only preferable embodiments of the specification, and are not used to limit the specification. Any modifications, equivalent replacements, and improvements, etc. within the spirit and scope of the specification shall be included within the protection scope of the specification.

What is claimed is:

1. A data migration method, applied to each data node of a plurality of data nodes comprised in a distributed system, wherein the method comprises:
   determining a target data node and a table to be migrated of a present data node for a present data migration task;
   determining a migration state of the table to be migrated as a first state, wherein the first state indicates that a double write operation is performed on incremental data;
   synchronizing state information indicating the first state with the target data node, so that the target data node determines a migration state of a target data table of the target data node as the first state; and
   writing, to the target data table of the target data node and the table to be migrated of the present data node, the incremental data for the table to be migrated under the first state of both the table to be migrated and the target data table by using the double write operation, such that a change operation on the table to be migrated is performed in both the table to be migrated of the present data node and the target data table of the target data node, wherein the incremental data is data obtained by performing, after both the migration state of the table to be migrated and the migration state of the target data table are determined as the first state, the change operation on data in the table to be migrated.

2. The method according to claim 1, wherein, after determining the target data node and the table to be migrated of the present data node for the present data migration task, the method further comprises:
   acquiring, from a database of the present data node, metadata of the table to be migrated; and
   establishing, according to the metadata, the target data table in a database of the target data node.

3. The method according to claim 1, further comprising:
   writing, to the target data table of the target data node, stock data in the table to be migrated, wherein the stock data is data in the table to be migrated before both the migration state of the table to be migrated and the migration state of the target data table are determined as the first state.

4. The method according to claim 3, wherein, before writing, to the target data table of the target data node and the table to be migrated, the incremental data in the table to be migrated, the method further comprises:
   recording site information, wherein the site information indicates a value range of a primary key in the table to be migrated before the incremental data is written to the table to be migrated and the target data table;
   the writing, to the target data table of the target data node, the stock data in the table to be migrated, comprises:
   acquiring the site information of the table to be migrated;
   determining, according to the value range of the primary key in the table to be migrated indicated by the site information, the stock data in the table to be migrated; and
   reading the stock data in the table to be migrated and writing the stock data to the target data table.

5. The method according to claim 3, wherein, in a case where both a migration state of the table to be migrated and a migration state of the target data table are a second state, an operation of writing the stock data to the target data table is performed;
   before writing, to the target data table of the target data node, the stock data in the table to be migrated, the method further comprises:
   determining the migration state of the table to be migrated as the second state; and
   synchronizing state information indicating the second state with the target data node, so that the target data node determines the migration state of the target data table as the second state.

6. The method according to claim 1, wherein the change operation performed on the data in the table to be migrated and the operation of determining the migration state of the table to be migrated and the migration state of the target data table are mutually exclusive.

7. The method according to claim 6, wherein the change operation performed on the data in the table to be migrated is performed after a read lock for the table to be migrated is acquired;
   the operation of determining the migration state of the table to be migrated and the migration state of the target data table is performed after a write lock for the table to be migrated is acquired; and the read lock and the write lock are mutually exclusive.

8. The method according to claim 1, wherein, before writing, to the target data table of the target data node and the table to be migrated, the incremental data in the table to be migrated, the method further comprises:

recording site information, wherein the site information indicates a value range of a primary key in the table to be migrated before both the migration state of the table to be migrated and the migration state of the target data table are determined as the first state; and the site information is used to determine the stock data of the table to be migrated.

9. The method according to claim 3, further comprising:
after the stock data has been written to the target data table of the target data node, sending a switch request to the target data node, wherein the switch request is used to switch, to the target data table, a read operation on the table to be migrated; and
after the switching is completed, stopping a write operation on the table to be migrated.

10. The method according to claim 9, wherein the change operation performed on the data in the table to be migrated and the operation of switching, to the target data table, the read operation on the table to be migrated are mutually exclusive.

11. The method according to claim 10, wherein the change operation performed on the data in the table to be migrated is performed after a read lock for the table to be migrated is acquired;
the operation of switching, to the target data table, the read operation on the table to be migrated is performed after a write lock for the table to be migrated is acquired; and the read lock and the write lock are mutually exclusive.

12. The method according to claim 9, wherein the sending the switch request to the target data node, further comprises:
after verifying that the data in the table to be migrated is consistent with the data in the target data table, sending the switch request to the target data node.

13. A computer device, comprising a memory, a processor, and a computer program which is stored in the memory and is run on the processor, wherein the processor, when executing the computer program, implements the method according to claim 1.

14. A non-transitory computer-readable storage medium, wherein the computer-readable storage medium has stored a computer program, and the computer program, when executed by a processor, implements the method according to claim 1.

15. The method according to claim 5, wherein the change operation performed on the data in the table to be migrated and the operation of determining the migration state of the table to be migrated and the migration state of the target data table are mutually exclusive.

16. The method according to claim 15, wherein the change operation performed on the data in the table to be migrated is performed after a read lock for the table to be migrated is acquired;
the operation of determining the migration state of the table to be migrated and the migration state of the target data table is performed after a write lock for the table to be migrated is acquired; and the read lock and the write lock are mutually exclusive.

17. A data migration apparatus, applied to each data node of a plurality of data nodes comprised in a distributed system, wherein the apparatus comprises:
at least one processor; and
a memory communicatively connected with the at least one processor,
wherein the memory stores instructions executable by the at least one processor, and the instructions, when executed by the at least one processor, cause the at least one processor to perform operations of:
determining a target data node and a table to be migrated of a present data node for a present data migration task;
determining a migration state of the table to be migrated as a first state, wherein the first state indicates that a double write operation is performed on incremental data;
synchronizing state information indicating the first state with the target data node, so that the target data node determines a migration state of a target data table of the target data node as the first state; and
writing, to the target data table of the target data node and the table to be migrated of the present data node, the incremental data for the table to be migrated under the first state of both the table to be migrated and the target data table by using the double write operation, such that a change operation on the table to be migrated is performed in both the table to be migrated of the present data node and the target data table of the target data node, wherein the incremental data is data obtained by performing, after both the migration state of the table to be migrated and the migration state of the target data table are determined as the first state, the change operation on data in the table to be migrated.

18. A distributed system comprising a plurality of data nodes, wherein each data node of the plurality of data nodes is a computer device comprising a memory, a processor, and a computer program which is stored in the memory and is run on the processor, wherein the processor of each computer device, when executing the computer program, implements operations of:
determining a target data node and a table to be migrated of a present data node for a present data migration task;
determining a migration state of the table to be migrated as a first state, wherein the first state indicates that a double write operation is performed on incremental data;
synchronizing state information indicating the first state with the target data node, so that the target data node determines a migration state of a target data table of the target data node as the first state; and
writing, to the target data table of the target data node and the table to be migrated of the present data node, the incremental data for the table to be migrated under the first state of both the table to be migrated and the target data table by using the double write operation, such that a change operation on the table to be migrated is performed in both the table to be migrated of the present data node and the target data table of the target data node, wherein the incremental data is data obtained by performing, after both the migration state of the table to be migrated and the migration state of the target data table are determined as the first state, the change operation on data in the table to be migrated.

* * * * *